US011392708B2

(12) United States Patent
Takahashi

(10) Patent No.: US 11,392,708 B2
(45) Date of Patent: Jul. 19, 2022

(54) METHOD AND SYSTEM FOR EMBEDDING SECURITY IN A MOBILE COMMUNICATIONS DEVICE

(75) Inventor: Richard J. Takahashi, Phoenix, AZ (US)

(73) Assignee: Harris Corporation, Melbourne, FL (US)

( * ) Notice: Subject to any disclaimer, the term of this patent is extended or adjusted under 35 U.S.C. 154(b) by 427 days.

(21) Appl. No.: 13/198,848

(22) Filed: Aug. 5, 2011

(65) Prior Publication Data
US 2013/0034230 A1 Feb. 7, 2013

(51) Int. Cl.
G06F 21/00 (2013.01)
G06F 21/60 (2013.01)
H04W 12/02 (2009.01)
H04L 9/40 (2022.01)
H04M 1/67 (2006.01)
H04M 1/72409 (2021.01)
(Continued)

(52) U.S. Cl.
CPC ........ *G06F 21/606* (2013.01); *H04L 63/0428* (2013.01); *H04M 1/67* (2013.01); *H04M 1/72409* (2021.01); *H04W 12/02* (2013.01); *H04W 12/033* (2021.01); *H04M 1/675* (2013.01)

(58) Field of Classification Search
CPC ........ G06F 21/57; G06F 21/34; G06F 21/445; G06F 21/32; H04L 9/3234; H04L 9/0897; H04L 2209/127; H04L 63/0853
USPC .......... 713/189, 168, 193, 186; 726/26, 5, 9; 380/259, 255, 247
See application file for complete search history.

(56) References Cited

U.S. PATENT DOCUMENTS 5,524,134 A * 6/1996 Gustafson et al. ........... 455/410
5,949,881 A * 9/1999 Davis ...................... G06F 21/34
713/168
6,212,410 B1 4/2001 Ishida
(Continued)

FOREIGN PATENT DOCUMENTS

DE 10140544 A1 * 3/2003 .............. H04M 1/00
DE 10140544 A1 * 3/2003 .............. H04M 1/67
EP 0 680 171 A2 11/1995

OTHER PUBLICATIONS

International Search Report and Written Opinion dated Oct. 12, 2012 in WIPO Appln. No. PCT/US2012/049420.
(Continued)

*Primary Examiner* — Alexander Lagor
(74) *Attorney, Agent, or Firm* — Kiklis and Clark, PLLC

(57) ABSTRACT

Methods and systems are provided that provide a portable, cryptographic hardware-software device allowing balancing of the needed heightened security while maintaining the modified communication device's original features and value. The system comprises a single chip comprising a self-contained security boundary and cryptographic processing, and is enabled to quickly and easily connect to and modify an existing, commercial, off the shelf mobile communication device. The systems may be enabled to modify the existing device by being contained in hardware, for example the battery of a smart phone. Then, the system may be connected to the existing device's interface, for example via a "micro-USB" or other suitable connection, and subsequently provide cryptographic functionality to the existing device.

20 Claims, 4 Drawing Sheets

(51) Int. Cl.
*H04W 12/033* (2021.01)
*H04M 1/675* (2006.01)

(56) References Cited

U.S. PATENT DOCUMENTS

| | | | |
|---|---|---|---|
| 6,975,092 B2 | 12/2005 | Edington et al. | |
| 7,667,429 B2 | 2/2010 | Little | |
| 2002/0194237 A1 | 12/2002 | Takahashi et al. | |
| 2003/0074572 A1* | 4/2003 | Hayashi | H04L 9/0897 |
| | | | 713/193 |
| 2004/0215963 A1 | 10/2004 | Kaplan | |
| 2005/0050325 A1* | 3/2005 | Ohkubo | G06F 21/31 |
| | | | 713/168 |
| 2005/0082623 A1* | 4/2005 | Sun | H01L 21/86 |
| | | | 257/401 |
| 2005/0244037 A1* | 11/2005 | Chiu | G06F 21/32 |
| | | | 382/124 |
| 2006/0013218 A1 | 1/2006 | Shore et al. | |
| 2007/0016957 A1* | 1/2007 | Seaward et al. | 726/26 |
| 2007/0273327 A1 | 11/2007 | Daniel et al. | |
| 2008/0049938 A1 | 2/2008 | Singhal | |
| 2009/0065571 A1* | 3/2009 | Jain | 235/379 |
| 2009/0070861 A1 | 3/2009 | Jain | |
| 2009/0145972 A1* | 6/2009 | Evans | G06Q 20/341 |
| | | | 235/492 |
| 2011/0086611 A1 | 4/2011 | Klein et al. | |
| 2012/0011372 A1* | 1/2012 | Yu | G06F 21/74 |
| | | | 713/193 |

OTHER PUBLICATIONS

EP 12 822 495.3 Extended Search Report dated Apr. 7, 2015.
Written Opinion of the International Searching Authority—dated Feb. 20, 2014—PCT Appln. No. PCT/US 12/49420.
EP Appln. No. 12 822 495.3—Office Action dated Jan. 27, 2017.
Zhang, Q. et al., A User-Centric M-Payment Solution, Mobile Technology, Applications and Systems, 2005 2nd International Conference on Guangzhou, China Nov. 15-17, 2005.

* cited by examiner

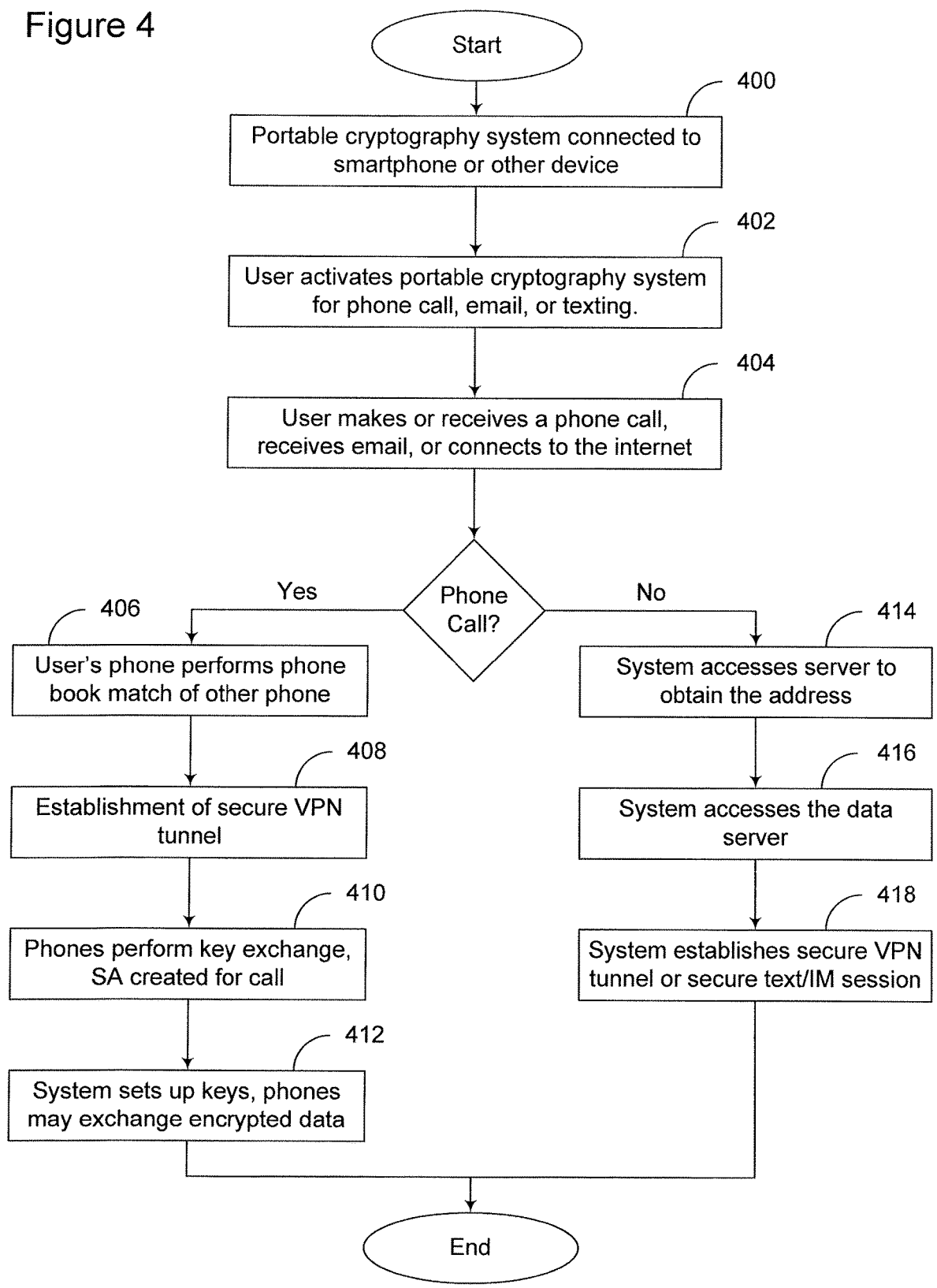

METHOD AND SYSTEM FOR EMBEDDING SECURITY IN A MOBILE COMMUNICATIONS DEVICE

This generally relates to secure mobile telephone communications, and more specifically to portable mobile telephone security hardware.

BACKGROUND

Many modern professionals share a need for timely and secure access to sensitive information. Given the current state of cellular telephone technology, specifically "smart phones," mobile phones, "tablets" and other mobile devices that offer more advanced computing ability and connectivity than a contemporary feature phone, including powerful processors, abundant memory, larger screens, and open operating systems; many professionals obtain such sensitive information via their cellular telephone over a cellular network. Such information may be obtained via the cellular telephone either through an internet browser, installed email and texting or other instant messaging ("TM") applications, or a traditional telephone call.

For example, U.S. military and Department of Defense ("DOD") civilian personnel need timely access to information from the internet as well as critical mission data, for both military and civilian operations. Information communication and data sharing within the U.S. government and DOD may be critical, and are conventionally accomplished using mobile communication technologies such as wifi, Bluetooth, and multiple forms of cellular service and Global Positioning System ("GPS") receivers. An emerging leader in commercial, off the shelf, information and communications access is the smart phone or tablets.

The state of modern cellular telephone technology is rife with smart phones and tablets. New smart phone releases now occur on the order of months, with multiple new smart phones coming to market every year. However, development of a smart phone still occurs on the order of years, with most smart phones taking approximately 2 years for full development and product launch.

Conventional cellular telephones may implement security in two different ways. Some conventional cellular telephones are fully customized, from the initial design steps, to include hardware-based cryptography embedded on the cellular telephone. However, these systems often require 4 years development time. Further, because the cryptography is embedded on the individual cellular telephone, it is not portable. If the cellular telephone is broken or otherwise disabled, the cryptographic capability is also lost. New generations of cellular telephones often require the same development time to add cryptography.

The second way that conventional cellular telephones implement security is through software. Conventional cryptographic software is portable, to the extent that necessary software and application codes are provided and may be loaded onto the phone. However, conventional cryptographic software, specifically because it is software, also has many shortcomings. Software may be altered without the user knowing. For example, a third party may pose as a system administrator or hidden application that can copy the encryption keys and upload a virus or other malware onto the cryptographic application, compromising the very security the cryptographic application is designed to provide. Further, the software on the cellular telephone can be altered over a network and compromise as many smart phones as desired without detection.

Thus, the downsides to using commercial smart phones in an environment which prizes security are at least twofold—operational security and communication security. Today's smart phones are vulnerable to eavesdropping. Further, software only cryptographic enhancements designed to secure communications may not be resistant to compromise by intruders, they are vulnerable to such security breaches as covert encryption keys extraction, malware, spoofing, covert snooping, and/or modification. In heightened security environments, these problems are joined by the fact that a need for increased security, authentication, and integrity; for example the U.S. military's information assurance requirements; elevates communications solution and development costs by orders of magnitude, diluting the usefulness of commercial, off the shelf smart phone technology in such environments.

Accordingly, there is a desire for a solution to these and other related problems.

SUMMARY

In accordance with the methods and systems consistent with the present invention, a mobile communication device is provided comprising a battery for the mobile communication device configured to attach to the cryptographic chip. The mobile communication device further provides a cryptographic chip attachable to the battery, and configured to connect to the mobile communication device to provide encrypted communication between the mobile communication device and another communication device.

In one implementation, a mobile communication device is provided comprising a cryptographic chip attachable to the mobile communication device, and configured to connect to the mobile communication device to provide encrypted communication between the mobile communication device and another communication device.

In yet another implementation, a method in a mobile communication device is provided, comprising connecting, to a mobile communication device, a cryptographic chip attached to the battery of the mobile communication device. The method further comprises connecting a phone call from with a second communication device, and activating the cryptographic chip in response to the connected phone call. The method also comprises encrypting data to be transferred between the mobile communication device and the second communication device, and transmitting encrypted data between the mobile communication device and the second communication device.

BRIEF DESCRIPTION OF THE DRAWINGS

FIG. 4 illustrates steps in an exemplary method of using the portable cryptography system in accordance with methods and systems consistent with the present invention.

DETAILED DESCRIPTION

Methods and systems in accordance with the present invention provide a portable, cryptographic hardware-software device allowing balancing of the needed heightened security while maintaining the modified communication device's original features and value. The system comprises a single chip comprising a self-contained security boundary and cryptographic processing, and is enabled to quickly and easily connect to and modify an existing, commercial, off the shelf mobile communication device.

Methods and systems in accordance with the present invention may be enabled to modify the existing mobile communication device by being contained in hardware, for example the battery of a smart phone. Then, the system may be connected to the existing mobile communication device interface, for example via a "micro-USB" or other suitable connection, and subsequently provide cryptographic functionality to the existing device. In some implementations, this cryptographic functionality may also be secured. In some implementations security of the cryptographic functionality may be provided by an associated Crypto Ignition Key ("CIK"). In other implementations, security of the cryptographic functionality may be provided via biometrics; for example fingerprint scans, retinal scans, pattern recognition, DNA sampling, or any combinations thereof.

Methods and systems in accordance with the present invention may be contained within hardware, and thus, they cannot be altered or compromised through a network. Further, methods and systems in accordance with the present invention provide a portable cryptographic device. The piece of hardware containing the cryptographic functionality, for example a smart phone battery, may be developed in a time on the order of months, and may be inserted into and provide security to any smart phone compatible with that piece of hardware, thus alleviating the problem of development times on the order of years for each new device with embedded cryptography. The same cryptographic hardware may be used for many different types of cellular telephones and smart phones.

Figure 1:
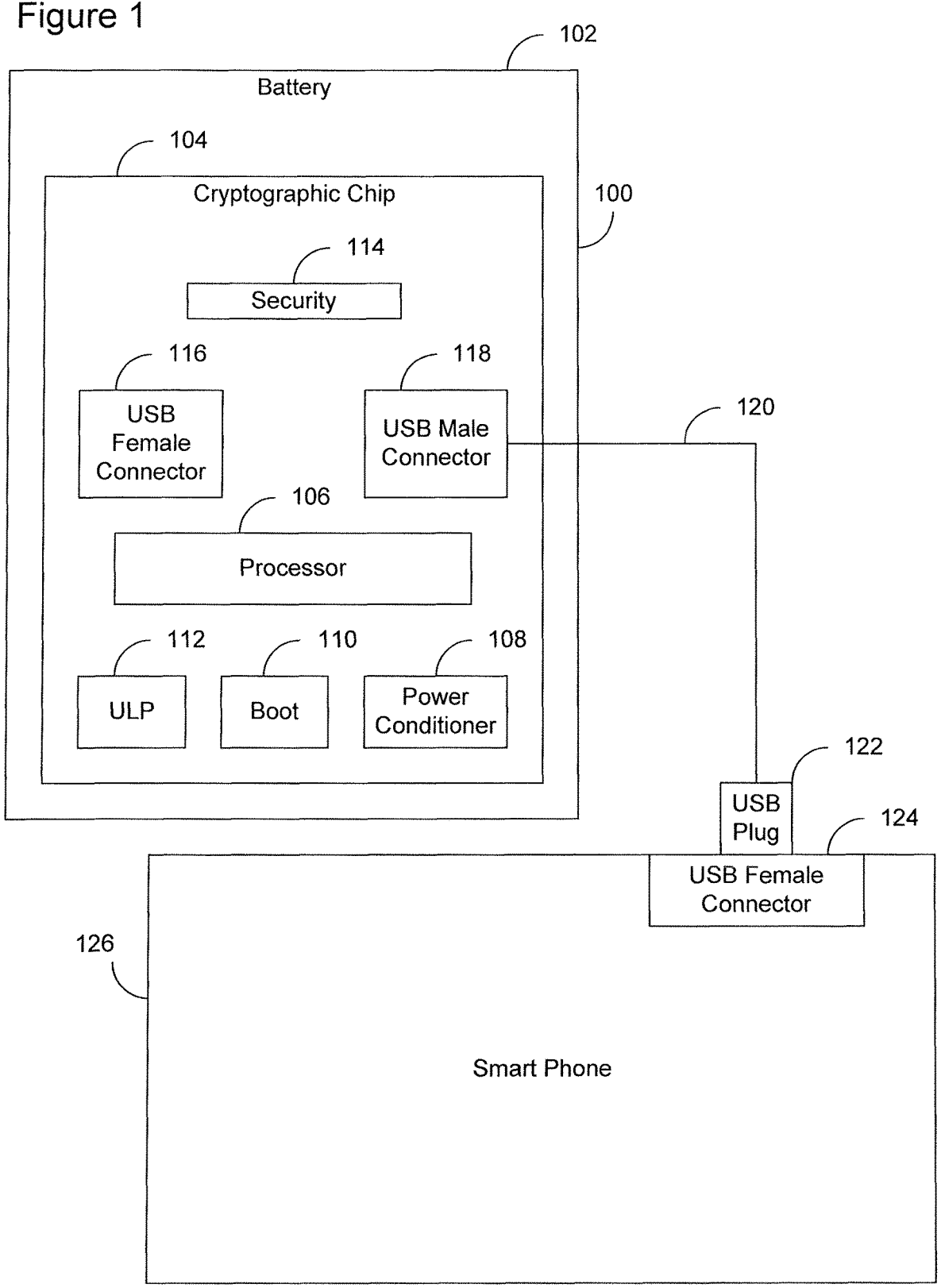
FIG. 1 illustrates an exemplary embodiment of a hardware-software portable cryptography system made in accordance with methods and systems consistent with the present invention.

FIG. 1 illustrates an exemplary embodiment of a hardware-software portable cryptography system made in accordance with methods and systems consistent with the present invention. Portable Cryptography System 100 comprises Battery 102 and Cryptographic Chip 104, and connects to Smart Phone 126. Although disclosed as a battery in this implementation, Battery 102 may be any other hardware device or component, and does not have to be a battery. Smart Phone 126 may be any mobile data processing device such as a mobile communications device, cellular telephone, smart phone, or "walkie talkie" radio.

Cryptographic Chip 104 comprises Processor 106, a secure network processor which may provide cryptographic and other security services for packet data communications. Cryptographic Chip 104 further comprises Power Conditioner 108, which inputs direct current ("DC") power and derives the required DC voltages to the crypto chip. Cryptographic Chip 104 further comprises Boot 110, the boot-up firmware to configure the crypto chip for the targeted application. Cryptographic Chip 104 further comprises ULP ("Ultra Low Power") 112, a power management device. ULP 112 monitors host system activity, and when the system's cryptography functionality is not active, ULP 112 powers the system off to save system power. In some implementations, ULP 112 may be an 8-bit microprocessor. Cryptographic Chip 104 further comprises Security 114, a device which secures the operation of the cryptographic functionality so that it may only be initiated by an authorized user. In some implementations, Security 114 may be a CIK, which may be connected or plugged in and thereby initiate the system's cryptographic functionality, and when removed, disable the cryptographic functionality. In other implementations, Security 114 may utilize biometrics. For example, Security 114 may be a fingerprint scanner, a retinal scanner, a facial recognition system, or a DNA analysis system. In such implementations, the system would be programmed to recognize an authorized user's biometric information and would only activate cryptographic functionality when an authorized user's biometric information was present.

Cryptographic Chip 104 further comprises USB Female Connector 116. In some implementations, USB Female Connector 116 may be a micro-USB. USB Female Connector 116 may be used for AC Power Adapter feed-through, allowing charging of the Smart Phone 126 when it is connected to Portable Cryptography System 100, and charging of Power 108. USB Female Connector 116 may also allow connection of Smart Phone 126 to any other USB device and/or host when Smart Phone 126 is connected to Portable Cryptography System 100. Cryptographic Chip 104 further comprises USB Male Connector 118, which is connected to USB flex print or other low profile Cable 120 and USB Plug 122. In some implementations, USB Male Connector 118, USB Cable 120, and USB Plug 122 may be a micro-USB system. In other implementations, the connection between Portable Cryptography System 100 and Smart Phone 126 may be accomplished by a low profile cable system utilizing landing pads and spring loaded contacts to facilitate quick "swapping" of Portable Cryptography System 100. The low profile cable system may be placed in the battery compartment with one end connected to a male micro USB connector to the phone and the other end having flat landing connector pads. The crypto chip 104 may have spring loaded pins that connect to the landing pads and provide quick swap capability. This may be implemented with a flex print cable with landing pads.

In other implementations, the connection of the Portable Cryptography System 100 to Smart Phone 126 may be accomplished by any other appropriate interface, such as a SIM card interface or a MicroSD memory card interface. Portable Cryptography System 100 is connected to Smart Phone 126 by plugging USB Plug 122 into USB Female Connector 124, located on Smart Phone 126.

Figure 2:
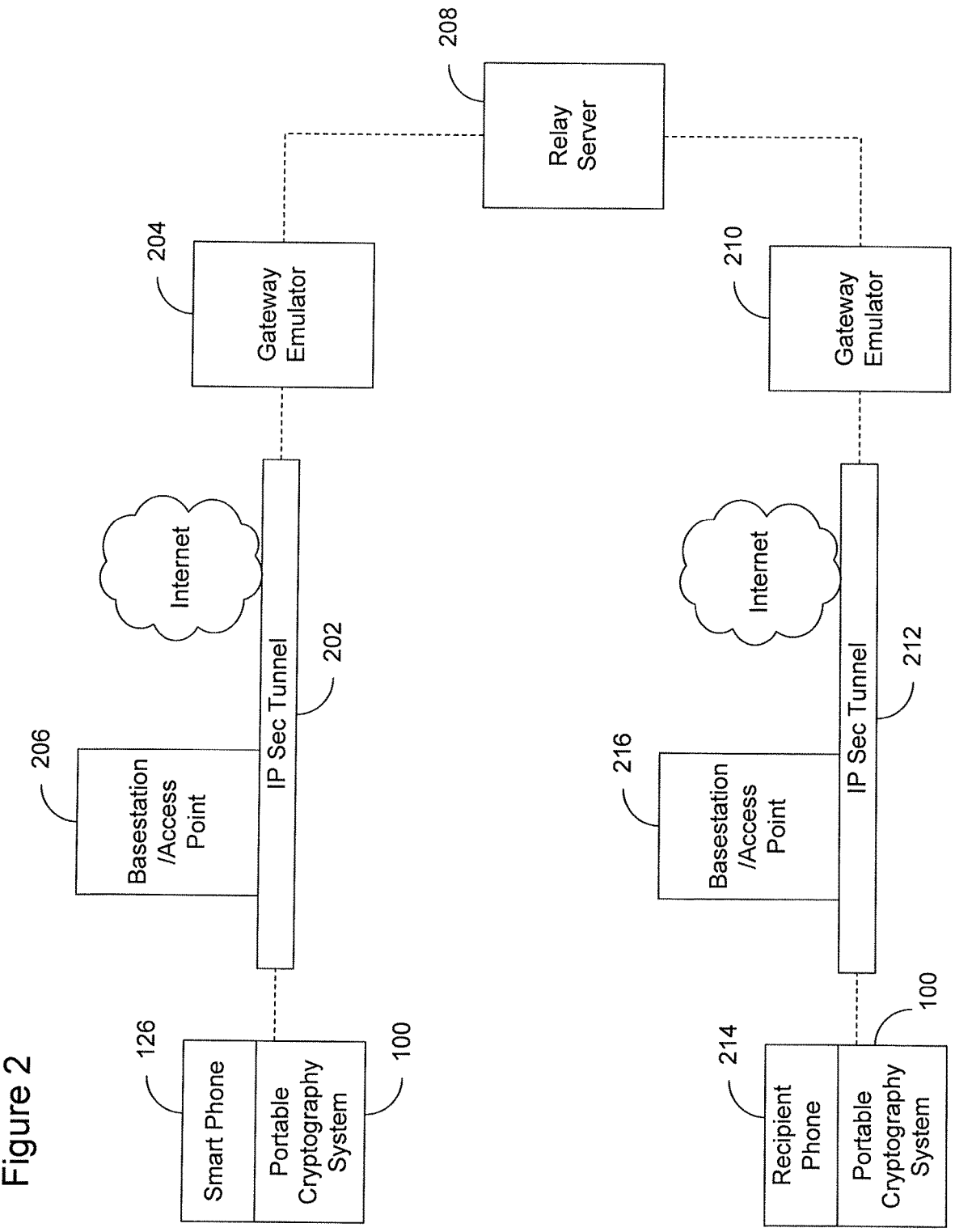
FIG. 2 illustrates an exemplary embodiment of the secure communication network established between two telephones by a hardware-software portable cryptography system made in accordance with methods and systems consistent with the present invention.

FIG. 2 illustrates an exemplary embodiment of the secure communication network established between two telephones by a hardware-software portable cryptography system made in accordance with methods and systems consistent with the present invention. When the user initiates a secure phone call or text messaging or other IM session, Smart Phone 126, which is enabled with Portable Cryptography System 100, sends the data to be encrypted to the system. The Portable Cryptography System 100 adds a first layer of encryption, which may be based on any appropriate protocol, for example transport layer security ("TLS") datagram transport layer security ("DTLS") encryption or secure real-time transport protocol ("SRTP") encryption. The system also adds a second layer of encryption, IP Sec tunnel encryption, establishing IP Sec Tunnel 202 with Gateway Emulator 204. The system handles the key negotiation for each layer of encryption and sends any information needed for routing data packets back to Smart Phone 126. This information may include, for example, the destination and source IP addresses, the port number, and/or the data type (i.e. UDP or TCP) of the Smart Phone 126 and/or the Gateway Emulator 204. This information may then be used to route the data packets to the appropriate location. The encrypted data is sent through IP Sec Tunnel 202 to the internet via Basestation/Access Point 206, a basestation for 3G/4G service and access point for WiFi service. The encrypted data is then routed to Gateway Emulator 204, which receives the encrypted data and removes the IP Sec encryption before forwarding the data through Relay Server 208 to Gateway Emulator 210. Gateway Emulator 210 has negotiated its own IP Sec Tunnel 212 with Recipient Phone 214, and thus adds another level of IP Sec encryption onto the data. The encrypted data is sent through IP Sec Tunnel 216 and the internet to Basestation/Access Point 218, and then on to Recipient Phone 214, which is also enabled with a portable cryptography system, for example another unit of Portable Cryptography System 100. The system on Recipient Phone 214 then decrypts both the first layer encryption and the IP Sec encryption added by Gateway Emulator 210 and forwards the unencrypted data to Recipient Phone 214.

Figure 3:
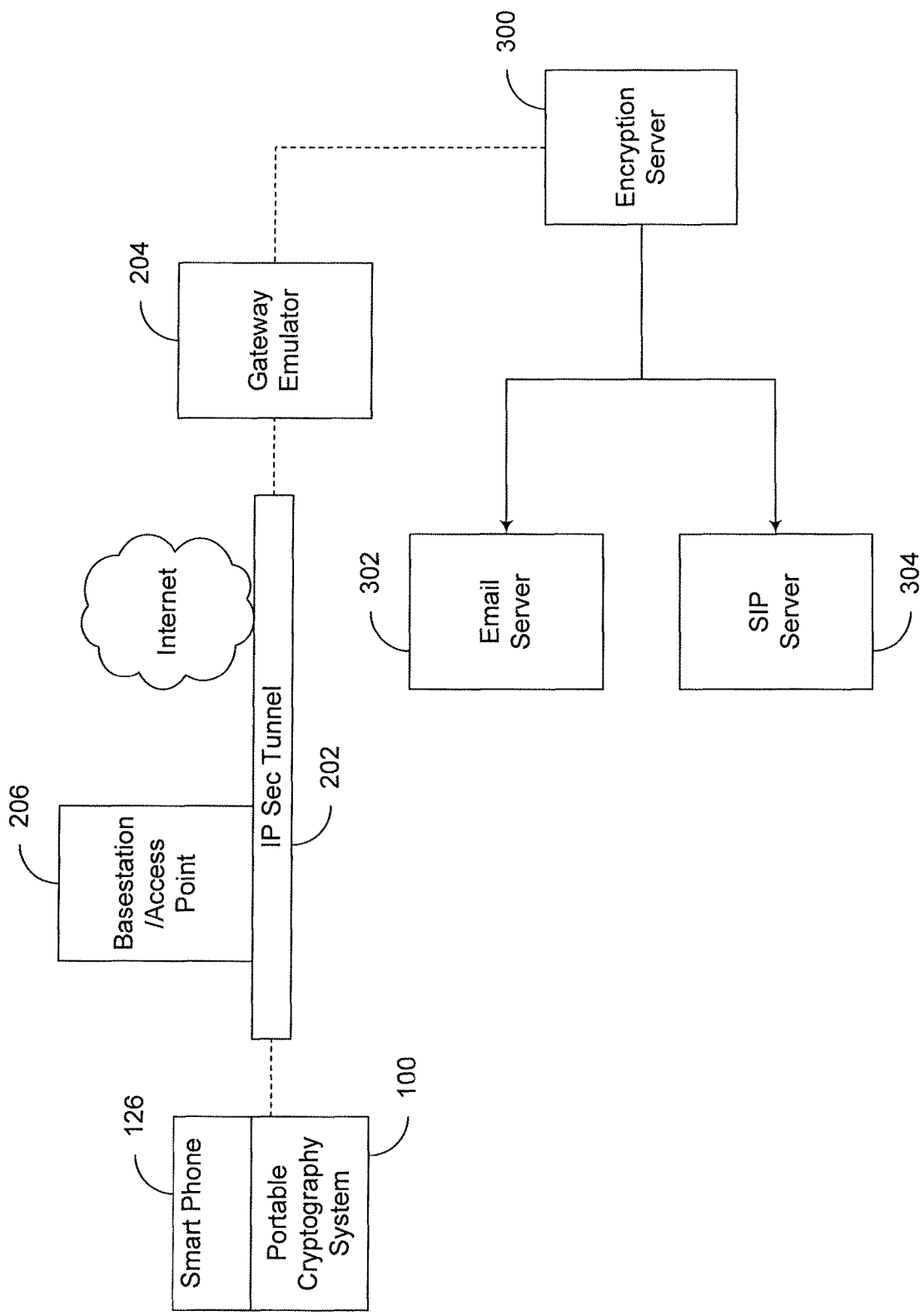
FIG. 3 illustrates an exemplary embodiment of the secure communication network established between a telephone and an email server or a session initiation protocol ("SIP") server by a hardware-software portable cryptography system made in accordance with methods and systems consistent with the present invention.

FIG. 3 illustrates an exemplary embodiment of the secure communication network established between a telephone and an email server or a session initiation protocol ("SIP") server by a hardware-software portable cryptography system made in accordance with methods and systems consistent with the present invention. When the user initiates a secure email session, secure internet browsing session, or other secure use that does not require connection to another secure mobile device, Smart Phone 126, which is enabled with Portable Cryptography System 100, sends the data to be encrypted to the system. Portable Cryptography System 100 adds a first layer of encryption, which may be based on any appropriate protocol, for example TLS, DTLS, or SRTP encryption. The system also adds a second layer of encryption, IP Sec tunnel encryption, establishing IP Sec Tunnel 202 with Gateway Emulator 204. The system handles the key negotiation for each layer of encryption and sends any information needed for routing data packets back to Smart Phone 126. This information may include, for example, the destination and source IP addresses, the port number, and/or the data type (i.e. UDP or TCP) of the Smart Phone 126 and/or the Gateway Emulator 204. This information may then be used to route the data packets to the appropriate location. The encrypted data is sent through IP Sec Tunnel 202 to the internet via Basestation/Access Point 206, a basestation for 3G/4G service and access point for wife service. The encrypted data is then routed to Gateway Emulator 204, which receives the encrypted data and removes the IP Sec encryption before forwarding the data to Encryption Server 300. Encryption Server 300 removes the first layer of encryption and forwards the unencrypted data to the appropriate server, Email Server 302 or SIP Server 304.

For key management, secure phones implementing the system, for example Smart Phone 126 and Recipient Phone 214, employ session keys using over the network key exchange via the system's cryptographic libraries and key management software. This key management software employs public key cryptography for ephemeral keying using transport layer security ("TLS"), DTLS, or Internet Key Exchange ("IKE") version 2, for example. The system may implement a double encryption methodology by using two different encryption protocols or algorithms by encapsulating the first layer encryption protected data with another second layer encryption protocol or algorithm using different keys. Session keys may be authenticated and negotiated, for example, using a device-specific elliptical curve digital signature algorithm ("ECDSA"), P-384 private keys, and X.509 public key certificates. In some implementations, the private keys may be protected from unwanted disclosure by tamper detection techniques. Tamper detection is a method for detecting if the product has been opened or altered. There are two typical tamper detection methods: passive and active. Passive tamper detection uses a physical indicator to alert a user that a product has been opened. For example, passive tamper detection may use sensitive tape-seals, special tamper detection fasteners, or a casing to reveal the case has been opened. Active tamper detection on the other hand, may use a battery and sensors or a switch mounted inside a product chassis or case. If the case is subsequently opened, the tamper detector circuit will trigger an event. In some cases, the response to an event is to implement further security measures, for example zeroization—erasing of the keys and/or other sensitive material from the cryptographic module—or disabling of the product. In other implementations, the private keys may be protected by zeroization of split variables. In still other implementations the private keys may be protected by a CIK.

FIG. 4 depicts steps in an exemplary method of using the portable cryptography system in accordance with methods and systems consistent with the present invention. First, the portable cryptography system is connected to Smart Phone 126 or other suitable device (step 400). Next, the user may activate the desired system functionality, for example, secure phone call, secure email, or secure text messaging or other instant messaging system, for example in Blackberry Messenger for the Blackberry® by Research in Motion, Ltd. (step 402). The system may be activated at any time, and the user may power the system off when not in use. In some implementations, the system may be activated by entering a user-programmed or pre-programmed series of keystrokes on the keypad of Smart Phone 126. In other implementations the system may be activated by entering a password or PIN. In some implementations, system activation may require authorization from Security 114, which may be provided, for example, after the associated CIK is connected or after an authorized user's biometric information is recognized. Once the system is activated, the secure call application may be initiated, and user data transmission may be secured. In some implementations, the system may encrypt both data and voice transmissions.

Next, the user of Smart Phone 126 makes or receives a phone call from another device; sends or receives an email, text message, or other instant message; or connects to the internet (step 404). If the system is activated to provide cryptography during a phone call, the system may perform a phone book match of the other phone's phone number to the other phone's IP address (step 406). Then, the other phone's public key is retrieved by the system, which may use the public key to establish a secure IP tunnel (step 408). Next, the phones perform a key exchange and a security association ("SA") is created for the call (step 410). Finally, the system may set up the keys for the call, and the phones may exchange encrypted data (step 412). In some implementations, the secure phone call requires that the original phone call be terminated on the original network and "handed off" to a Voice Over Internet Protocol ("VOIP") application. In some implementations, transmission of voice traffic may be suspended during initialization of the secure call application. In some implementations, the system may display a message, for example "Going Secure," on the cellular telephone's screen. In some implementations, the system may display a further message, such as "Secure Call Ready," once the secure call application has initiated the secure call.

If the system is activated to provide a data cryptography function, for example secure email services, text messaging or other IM, or internet browsing, the system first accesses the SIP server to obtain the appropriate SIP address(es). In turn, the SIP server will provide the IP addresses to both the sender and receiver phones (step 414). Next, the system accesses the data server (step 416). For secure email, the system establishes a secure virtual private network ("VPN") tunnel to the email server; for secure texting or other IM, the system establishes a secure texting or IM session; and for secure internet browsing the system establishes a Secure Sockets Layer ("SLL"), Transport Layer Security ("TLS"), or VPN connection to the web server (step 418). In some implementations, the system may announce that it has been activated, through one or both of a verbal announcement or a displayed announcement on the screen of the host device, for example "Secure Email/Text Activated." After use, the user may terminate the data cryptography function. In some implementations, termination of the secure email function will cause the system to also terminate the secure VPN tunnel. In some implementations, termination of the data cryptography function will cause the system to clear any residual data from the secured data sharing session.

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A mobile communication device, comprising:
   a battery for the mobile communication device configured to attach to a cryptographic chip; and
   the cryptographic chip attachable to the battery, and configured to connect to the mobile communication device to provide encrypted communication between the mobile communication device and another communication device, and configured to receive biometric information from a user and determine whether to authorize cryptographic functionality of the cryptographic chip based on the biometric information.

2. The mobile communication device of claim 1, wherein the cryptographic chip comprises a processor configured to encrypt communication.

3. The mobile communication device of claim 1, wherein the cryptographic chip further comprises:
   a first mini-USB connector configured to connect to the mobile communication device; and
   the mobile communication device comprises a second mini-USB connector configured to connect to the cryptographic chip.

4. The mobile communication device of claim 3, wherein the first mini-USB connector is configured to connect to the mobile communication device using a flex print cable with landing pads.

5. The mobile communication device of claim 1, wherein the cryptographic chip is configured to be activated by the mobile communication device.

6. The mobile communication device of claim 1, wherein the mobile communication device is one of: (1) a cell phone, (2) a smart phone, (3) a PDA, and (4) a walkie-talkie radio.

7. The mobile communication device of claim 1, wherein the cryptographic chip provides encrypted one of (1) encrypted data communication and (2) encrypted voice communication between the mobile communication device and the other communication device.

8. A mobile communication device, comprising:
   a cryptographic chip attachable to the mobile communication device, and configured to connect to the mobile communication device to provide encrypted communication between the mobile communication device and another communication device, and configured to receive biometric information from a user and determine whether to authorize cryptographic functionality of the cryptographic chip based on the biometric information, wherein the cryptographic chip further comprises a first mini-USB connector configured to connect to the mobile communication device; and
   the mobile communication device comprises a second mini-USB connector configured to connect to the cryptographic chip.

9. The mobile communication device of claim 8, wherein the cryptographic chip comprises a processor configured to encrypt communication.

10. The mobile communication device of claim 8, wherein the first mini-USB connector is configured to connect to the mobile communication device using a flex print cable with landing pads.

11. The mobile communication device of claim 8, wherein the cryptographic chip is configured to be activated by the mobile communication device.

12. The mobile communication device of claim 8, wherein the mobile communication device is one of: (1) a cell phone, (2) a smart phone, (3) a PDA, and (4) a walkie-talkie radio.

13. The mobile communication device of claim 8, wherein the cryptographic chip provides encrypted one of (1) encrypted data communication and (2) encrypted voice communication between the mobile communication device and the other communication device.

14. A method in a mobile communication device, comprising:
   connecting, to the a mobile communication device, a cryptographic chip attached to the battery of the mobile communication device;
   receiving, by the cryptographic chip, biometric information from a user and determining whether to authorize cryptographic functionality of the cryptographic chip based on the biometric information;
   connecting a phone call from a second communication device to the mobile communication device;
   activating the cryptographic chip in response to the connected phone call;
   encrypting data to be transferred between the mobile communication device and the second communication device; and
   transmitting encrypted data between the mobile communication device and the second communication device.

15. The method of claim 14, further comprising connecting the cryptographic chip to the mobile device via a mini-USB connection.

16. The method of claim 15, wherein the mobile communication device is one of: (1) a cell phone, (2) a smart phone, (3) a tablet, (4) PDA, and (5) a walkie-talkie radio.

17. The method of claim 14, further comprising transmitting encrypted voice data between the mobile communication device and the second communication device.

18. The mobile communication device of claim 1, wherein the cryptographic chip further comprises one of: (1) a fingerprint scanner, (2) retinal scanner, and (3) a facial recognition scanner, to receive the biometric information from the user.

19. The mobile communication device of claim 8, wherein the cryptographic chip further comprises one of: (1) a fingerprint scanner, (2) retinal scanner, and (3) a facial recognition scanner, to receive the biometric information from the user.

20. The method of claim 14, wherein the cryptographic chip further comprises one of: (1) a fingerprint scanner, (2) retinal scanner, and (3) a facial recognition scanner, which receives the biometric information from the user.

* * * * *